(12) United States Patent
Fick, Jr. et al.

(10) Patent No.: US 8,677,600 B2
(45) Date of Patent: Mar. 25, 2014

(54) METHODS OF DISPENSING AND MAKING POROUS MATERIAL WITH GROWTH ENHANCING ELEMENT

(75) Inventors: Michael Fick, Jr., Virginia Beach, VA (US); Eric Singer, Virginia Beach, VA (US)

(73) Assignee: General Foam Plastics Corporation, Norfolk, VA (US)

( * ) Notice: Subject to any disclaimer, the term of this patent is extended or adjusted under 35 U.S.C. 154(b) by 734 days.

(21) Appl. No.: 12/938,013

(22) Filed: Nov. 2, 2010

(65) Prior Publication Data

US 2011/0115112 A1    May 19, 2011

Related U.S. Application Data

(60) Provisional application No. 61/262,680, filed on Nov. 19, 2009.

(51) Int. Cl.
*B23P 25/00* (2006.01)

(52) U.S. Cl.
USPC .......... 29/527.1; 29/527.3; 29/530; 264/46.6; 264/51

(58) Field of Classification Search
USPC ............... 29/527.1, 527.3, 530; 264/46.6, 51, 264/219, 334; 425/4 R, 177, 233, 234, 404, 425/405.1, 420, 434, 451.9, 468, 470
See application file for complete search history.

(56) References Cited

U.S. PATENT DOCUMENTS

| 2,251,039 | A | * | 7/1941 | Da Silva ........................... 4/445 |
|---|---|---|---|---|
| 3,015,851 | A | * | 1/1962 | Wiles ............................. 264/53 |
| 3,187,069 | A | * | 6/1965 | Pincus et al. ................. 264/46.8 |
| 3,237,760 | A | * | 3/1966 | De Remer et al. ............ 206/597 |
| RE26,426 | E | * | 7/1968 | De Remer et al. ............ 206/597 |
| 3,419,455 | A | * | 12/1968 | Roberts ....................... 428/36.5 |
| 3,451,534 | A | * | 6/1969 | Parent et al. ................. 206/319 |
| 3,570,061 | A | * | 3/1971 | Andrews ...................... 425/144 |
| 3,961,445 | A | * | 6/1976 | Rack .............................. 47/74 |
| 4,072,673 | A | * | 2/1978 | Lammers ...................... 264/225 |
| 4,094,491 | A | * | 6/1978 | Towers ......................... 249/83 |
| 4,119,583 | A | * | 10/1978 | Filip et al. .................... 521/103 |
| 4,190,697 | A | * | 2/1980 | Ahrens ....................... 428/309.9 |
| 4,383,955 | A | * | 5/1983 | Rubio et al. ................. 264/46.6 |
| 4,390,337 | A | * | 6/1983 | Gately ............................ 425/89 |
| 4,405,681 | A | * | 9/1983 | McEvoy .................... 428/309.9 |
| 4,429,060 | A | * | 1/1984 | Ide ............................. 521/182 |
| 4,455,340 | A | * | 6/1984 | Okina .......................... 428/215 |
| 4,641,270 | A | * | 2/1987 | Lalloz et al. ................... 700/98 |
| 4,839,117 | A | * | 6/1989 | Swenson et al. ............. 264/46.4 |
| 4,860,815 | A | * | 8/1989 | Parker et al. .................... 164/47 |
| 5,129,804 | A | * | 7/1992 | Perantoni et al. ............ 425/117 |
| 5,435,959 | A | * | 7/1995 | Williamson et al. ......... 264/221 |
| 5,437,824 | A | * | 8/1995 | Carlisle et al. ................. 264/50 |
| 5,458,825 | A | * | 10/1995 | Grolman et al. ............. 264/401 |
| 5,569,420 | A | * | 10/1996 | Van Horne ................. 264/46.4 |
| 5,580,507 | A | * | 12/1996 | Williamson et al. ......... 264/221 |
| 5,728,333 | A | * | 3/1998 | Tabata et al. ................. 264/46.4 |
| 5,818,005 | A | * | 10/1998 | Pratt et al. ................. 219/69.15 |
| 5,901,593 | A | * | 5/1999 | Fritz ............................. 72/15.2 |

(Continued)

*Primary Examiner* — David Bryant
*Assistant Examiner* — Bayan Salone
(74) *Attorney, Agent, or Firm* — Ice Miller LLP (57) ABSTRACT

Embodiments of the present invention relate to a method of dispensing a porous material and to a method of making a porous material insert for various plant grow pots, plant bowls, and plant baskets, the porous material insert including a growth enhancing element integrated with and dispersed throughout the insert.

20 Claims, 10 Drawing Sheets

(56) References Cited

U.S. PATENT DOCUMENTS

| | | | |
|---|---|---|---|
| 5,989,699 A * | 11/1999 | Kuczynski et al. | 428/316.6 |
| 6,491,855 B1 * | 12/2002 | Harper | 264/227 |
| 7,195,726 B1 * | 3/2007 | Niswander | 264/51 |
| 7,407,340 B2 * | 8/2008 | Byles | 405/45 |
| 7,448,433 B2 * | 11/2008 | Ortiz et al. | 164/516 |
| 2002/0135091 A1 * | 9/2002 | Rivera et al. | 264/102 |
| 2006/0065383 A1 * | 3/2006 | Ortiz et al. | 164/4.1 |
| 2013/0116354 A1 * | 5/2013 | Rohatgi et al. | 521/97 |

* cited by examiner

METHODS OF DISPENSING AND MAKING POROUS MATERIAL WITH GROWTH ENHANCING ELEMENT

CROSS REFERENCE TO RELATED APPLICATION

This application claims benefit under 35 U.S.C. §119(e) of U.S. Provisional Patent Application Ser. No. 61/262,680, filed 19 Nov. 2009, which application is hereby incorporated by reference.

BACKGROUND

Embodiments of the present invention relate to a method of dispensing a porous material that can include a growth enhancing element and, more particularly, to a method of making a porous material insert by which a growth enhancing element is incorporated into the mixture for use in various plant grow pots, plant bowls, and plant baskets.

U.S. Pat. No. 7,407,340 to Byles discloses a modular, self-contained engineered irrigation landscape and flower bed panel. The irrigation apparatus of Byles includes a substantially continuous panel of porous material extending throughout the planting area, such that the porous area has spaces to allow movement of irrigation water therethrough. The spaces are of sufficient size to allow plant roots to grow therethrough.

Methods of dispensing foam and making foam that incorporate a growth enhancing element for use in Byles, among other things, are necessary and desired. By way of example only, and without limitation, the growth enhancing element can be a plant fertilizer.

SUMMARY

Briefly described, embodiments of the present invention relate to a method for dispensing porous material to form a porous material insert for use in a container. Embodiments of the present invention also relate to a method of making a porous material insert for a container whereby the insert contains a growth enhancing element.

The container is adapted to contain both the porous material insert and a plant, wherein the plant can grow in the container, such that it requires less watering because the porous material can absorb and dispense water as needed to roots of the plant. For example and not limitation, the container includes a grow pot, bowl, or basket. The instant method is particularly well suited to nondraining containers (i.e., containers without a drain hole) in which water would ordinarily collect and settle at the bottom of the container. The porous material insert includes foam, and, more particularly, can be a polyurethane foam. The porosity and absorption of the foam provides an efficient water-collection mechanism, which further provides a convenient water source for the plant roots which grow into the foam. And, by incorporation of a growth enhancing element into the foam, such as a plant fertilizer, a source of nutrients for the plant is further provided. The plant comprises a flower, herb, vegetable, palm, and the like.

The method of dispensing foam comprises creating a first mold. The first mold is approximately the size of the container in which the foam insert will be placed. The method also includes dispensing foam into a production mold, which is created from the first mold. For example, the production mold can be vacuum-formed from the first mold. Once the production mold is created, foam can be dispensed into the production mold, and the resulting foam can be appropriately sized for subsequent insertion into the container. For example, the created foam from the mold can be cut to a desired size for insertion into the container.

In an exemplary embodiment, the first mold can be a wooden mold that is created from and sized to fit inside the plant container. The wooden mold can be a male mold, upon which other molds can be made. From the wooden mold, a first polymer-based production mold can be created. The first polymer-based production mold can be vacuum-formed from the wooden mold. Next, a reverse mold can be created from the first polymer-based mold. The reverse mold can, for example, be an aluminum-based mold. The reverse mold can be machine formed from the first polymer-based mold. The reverse mold can be a main mold for use in creating a number of additional production molds. From the reverse mold a polymer pour mold (i.e., a second polymer-based production mold) can be machine-formed.

In an exemplary embodiment, foam can be dispensed into the polymer pour mold. The foam dispensed into the polymer pour mold can be cut to a desired size. Then, the foam insert can be placed into the bottom of a container to hold the plant. Ultimately, the plant and soil can be placed atop the foam insert.

In another exemplary embodiment, a growth enhancing element can be incorporated into the foam mixture to provide an improved growth environment for the plant. By way of example only, and without limitation, the growth enhancing element can be a plant fertilizer such as solid fertilizer pellets or granules. By mixing the enhancing element into the foam mixture before the foam is formed, the enhancing element is thoroughly dispersed throughout the foam. The combination of the foam material, which is intended to absorb water and dispense the water to the plant roots throughout the life of the plant, with the enhancing element, which is designed to release and provide nutrients to the plant when exposed to a water source, establishes an environment for stimulating and promoting plant growth.

These and other objects, features, and advantages of the present invention will become more apparent upon reading the following specification in conjunction with the accompanying drawings.

DETAILED DESCRIPTION

To facilitate an understanding of the principles and features of embodiments of the invention, they are explained hereinafter with reference to their implementation in an illustrative embodiment. In particular, embodiments of the invention are described in the context of being a method for dispensing foam to create porous material (foam) inserts sized for containers holding plants and including the additional feature of a growth enhancing element integrated into the foam insert.

Embodiments of the invention, however, are not limited to its method in making foam inserts for containers for holding plants. Rather, embodiments of the invention can be used when a method of dispensing foam is desired, or as is necessary. Thus, the method described hereinafter as dispensing foam for containers holding plants can also find utility as a method for dispensing foam for other applications, beyond that for containers having plants.

In addition, embodiments of the growth enhancing element of the invention are described in the context of being a fertilizer additive that can be imbedded into the foam insert to provide nutrients for the plant growth in the container. In particular, the fertilizer additive can be in a solid pellet or granular form. However, the invention herein described is not limited to the use of fertilizer as a growth enhancing element. Rather, embodiments of the invention can include any additive material, whether in liquid or solid form, that can be incorporated into the foam insert and that can improve and/or alter the properties of the foam or otherwise provide a benefit to the use of foam in the container. So, it may be desirable to incorporate an additive material into the foam insert that can modify its structural properties (i.e., weight, density, stiffness, porosity), electrical properties (i.e., conductivity, resistivity), or mechanical properties (i.e., sound absorption, solubility, heat resistance, thermal expansion, insulation), just to name a few examples. The scope of the invention herein described is intended to encompass all such forms of additives.

The steps, materials, and components described hereinafter as making up the various elements of the invention are intended to be illustrative and not restrictive. Many suitable steps, materials, and components that would perform the same or a similar function as the steps, materials, and components described herein are intended to be embraced within the scope of the embodiments of the invention. Such other materials, and components not described herein can include, but are not limited to, for example, materials that are developed after the time of the development of embodiments of the invention.

Exemplary embodiments of the present invention relate to a method of dispensing and a method of making foam. In an exemplary embodiment, the foam dispensed and made by the described methods can be to a specific shape and size that is tailored to fit inside a container. In some embodiments, the foam insert created by methods of the present invention can be used in a growing medium insert in various types and shapes of containers, e.g., grow pots, bowls, and baskets. The containers depicted in the exemplary embodiments presented herein are cylindrically-shaped containers, which are conventionally used as planters and the like; however, the method described herein is not limited to such containers. So, for example, a rectangular or square-shaped container could also be used without departing from the inventive scope.

A container shape can be created, such that the radius of the top of the container is approximately the same as the radius of its bottom. In addition, the container shape can be created such that its bottom radius is approximately the same as the top radius of the dispensed foam. In this manner, the foam dispensed will approximate a cylindrically-shaped insert that has a major axis parallel to the bottom of the container and a minor axis at a right angle to the major axis. Then, foam can be dispensed at approximately twice the size needed, such that the foam dispensed can be cut in half (along the major axis) to fit the container into which the foam insert is designed to be carried. This will produce two similarly-sized inserts.

In an exemplary embodiment, this can be accomplished by taking sample shots of dispensed foam created from test containers made in the desired diameter. Then, from these shots, computer aided design solid models (CADs) can be created. The test containers can be created by starting with a wooden mold, which is used to then make polymer-based molds (e.g., polyethylene molds) by vacuum forming. In some embodiments, additional molds can then be created by using the CADs to make a reverse mold for vacuum forming production molds. Preferably, the reverse mold is aluminum based.

Building on this method, another improved method in accordance with the exemplary embodiment can be used when a specific container shape is needed. To fit a customized container, the container details are initially measured and calculated to create the necessary CADs. The reverse mold can next be created by, for example, machining an aluminum-based mold for vacuum forming the final polymer-based pour molds. When creating the reverse mold, part shrinkage due to the natural expansion/contraction of the material can be contemplated and calculated for the polymer-based mold, and also for the final foam inserts. This calculated shrinkage dimension can be incorporated into the overall dimension of the reverse mold. To accommodate many container shapes, the foam can be contained by capping the mold so that the finished foam has a flat surface on both its top and bottom before cutting the foam insert (along the major axis as previously described) to the desired size.

In an exemplary embodiment, foam can be dispensed into the production mold. Foam can be dispensed from a liquid foam machine or like device, which, after dispensing the appropriate materials, and the necessary cure time, will form a foam block, shaped to fit in the inside of the container. The foam can be many types of foam, including porous material, webbed material, open-cell foam material, boned crumb rubber, polyurethane, polyethylene, combinations thereof, and the like. The foam can be made in a manner that is well understood. For example, a polyurethane foam can comprise a mixture of two primary chemicals, such as isocyanate and polyol blend, which when combined produce a chemical reaction. The two liquids are dispensed using precise gear metering pumps, which can control the quantities as necessary. Each liquid passes through a separate fluid line after which they are fed into a dynamic rotating screw-type agitator. The resulting mixture is emptied into the production mold to form the foam block. The foam reaction begins almost immediately upon the mixture of the chemicals, thus the process times may vary according to the specific formula used and the specifications of the foam product to be produced.

The "cream time" is the time from dispense of the liquid chemicals until the foam reaction begins. During this process, bubbles are formed and the mixture expands. The "set time" is the time it takes to complete the chemical reaction. The "de-molding time" is the "cure time" it takes for the foam to "set" to the touch, whereupon it can be removed from the mold for subsequent fabrication and use.

In an exemplary embodiment, a growth enhancing element can be incorporated into the foam mixture prior to the foam being introduced into the polymer pour mold (production mold). As more particularly described herein, the enhancing element can be a solid or granular form of fertilizer, which can be mixed with the liquid chemicals used to create the chemical reaction that forms the foam insert. Thus, by mixing the enhancing element before the step of curing the foam (i.e., allowing the foam to harden to the touch for handling and fabrication), a thorough disbursement of the enhancing element can be achieved.

In some embodiments, the foam inserts can be cut to the desired size by using a band saw fixture.

In some embodiments, the foam insert can be created by being dispensed in an appropriately-sized mold, which may be capped, without the need for the dispensed foam to be twice the size desired, such that a step of cutting the foam is eliminated.

Figure 1:
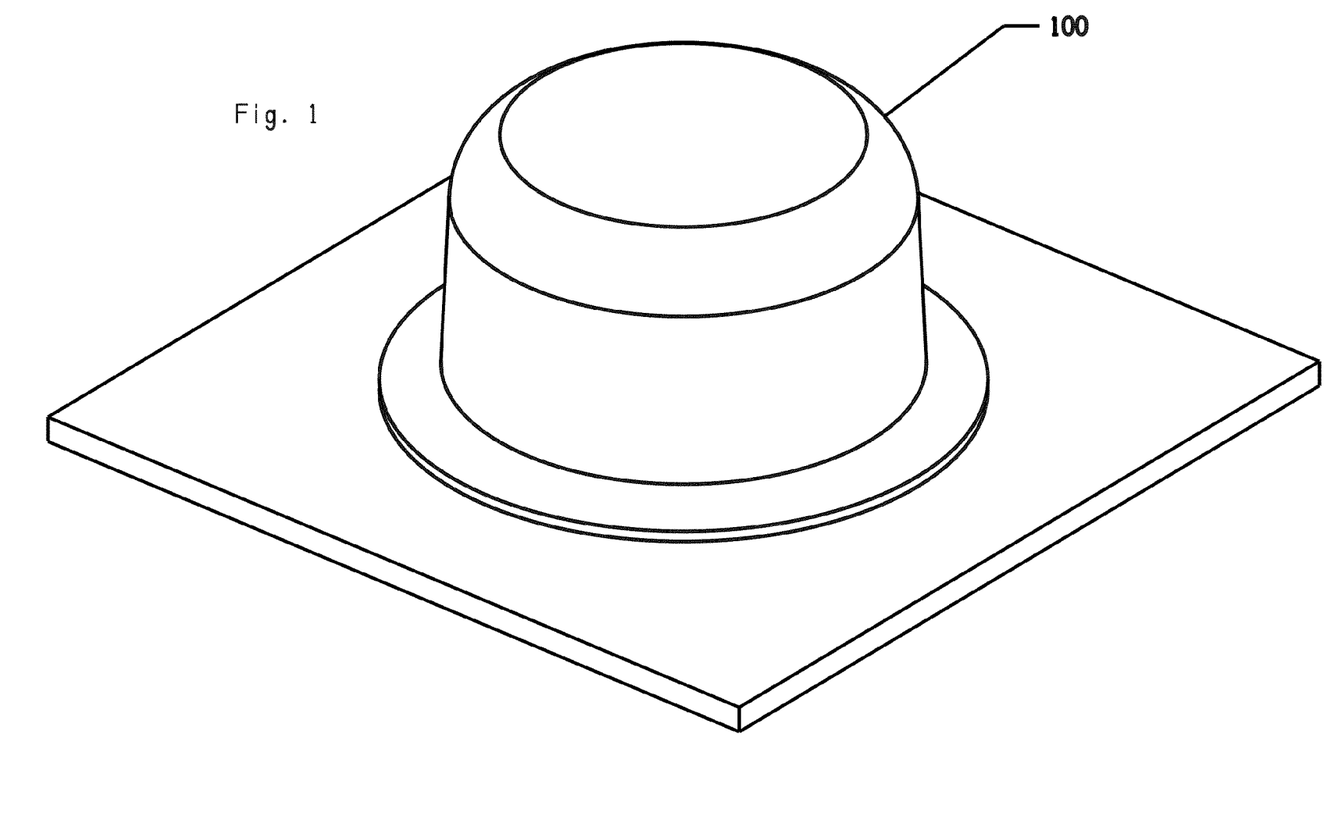
FIG. 1 illustrates a perspective view of a photograph of a first mold, in accordance with an exemplary embodiment of the present invention.

Referring now to the figures, FIG. 1 illustrates a perspective view of a first mold 100. The first mold 100 can be a male mold of the container for which the foam insert 600 will ultimately reside. In an exemplary embodiment, the first mold 100 can be made of wood.

In an exemplary embodiment, a sensing system can record and calculate the measurements of the container. Then, computer aided design solid models (CADs) can be created to represent the interior of the container. Once created, it can be used to create the first mold 100. For example and not limitation, the sensing system can read and calculate the dimensions and shape of the container to create the CADs. Then, a numerically-controlled machine can cut the first mold 100, e.g., out of wood, to match the specifications of the container.

In an exemplary embodiment, a production mold 400 (see FIG. 4) can be formed directly from the first mold 100. The production mold 400 can be polymer-based. For example and not limitation, the production mold 400 can also be constructed from other polymer materials, such as polyolefins, as well as ultra-high molecular weight (UHMW) polyethylenes, low, medium, and high density polyethylenes, polyurethanes, polyamides, and copolymers, and combinations thereof. In addition, other materials, including metals such as aluminum, titanium, and the like, metal alloys, ceramics, and the like, can be used for the production mold 400, without departing from the scope of the invention.

Figure 4:
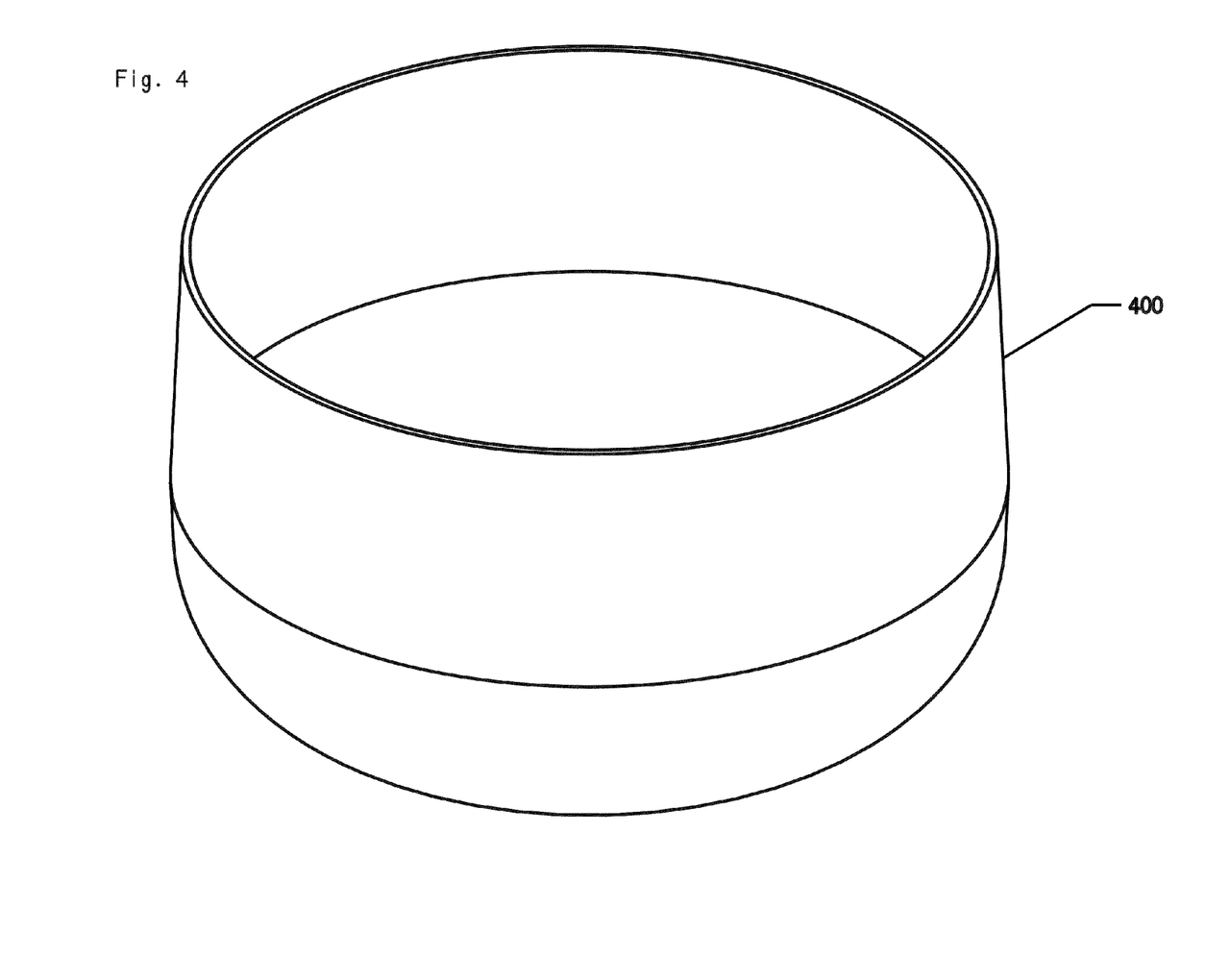
FIG. 4 illustrates a perspective view of a photograph of a polymer pour mold (i.e., second polymer-based production mold), in accordance with an exemplary embodiment of the present invention.

There are many ways by which the production mold 400 can be created. In an exemplary embodiment, the production mold 400 can be vacuum-formed directly from the first mold 100, i.e., from the wooden mold such that its inner dimensions match the outer dimension of the first mold 100. Alternatively, the production mold 400 can be machine-formed directly from the first mold 100.

Figure 2:
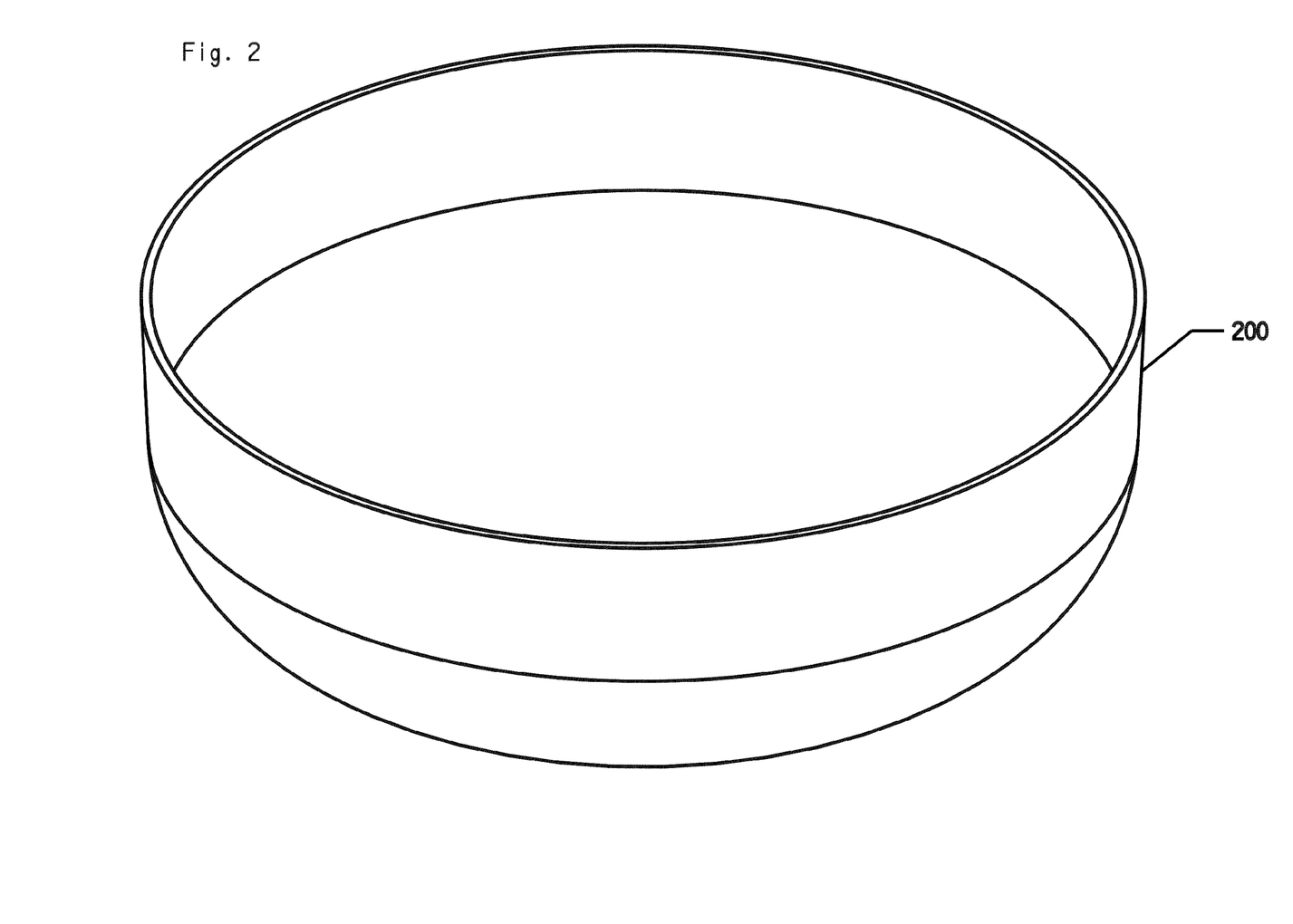
FIG. 2 illustrates a perspective view of a photograph first polymer-based of a production mold, which may be vacuum-formed from the wooden mold of FIG. 1, in accordance with an exemplary embodiment of the present invention.
Figure 3:
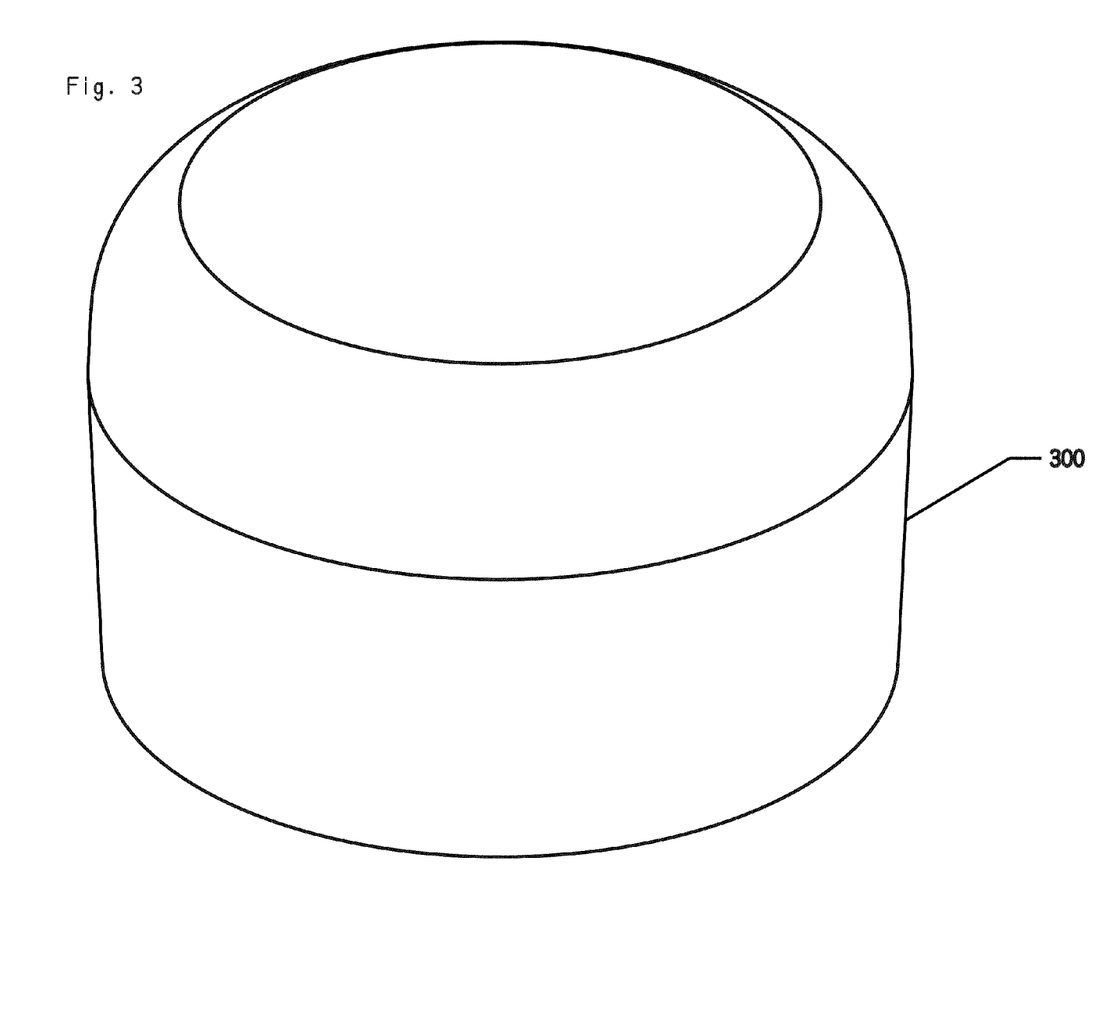
FIG. 3 illustrates a perspective view of a photograph of a reverse mold (e.g., an aluminum-based mold), which may be machine-formed from the first polymer-based production mold of FIG. 2, in accordance with an exemplary embodiment of the present invention.

In another exemplary embodiment, the production mold 400 can be made via a few additional, intermediary steps. As illustrated in FIG. 2, a first polymer-based production mold 200 can be vacuum-formed from the wooden mold 100. Then, as illustrated in FIG. 3, a reverse mold 300 (i.e., an aluminum-based mold) can be created from the first polymer-based production mold 200 of FIG. 2. The reverse mold 300 can be machine-formed from the first polymer-based production mold 200. By way of example, and not limitation, the reverse mold 300 can be made from aluminum. Other methods or substances are certainly possible. The reverse mold 300 can be the main mold for a number of other production molds 400, because it can be made of metal, such as aluminum, and can withstand various environments and is not susceptible to damage from various circumstances. Next, from the reverse mold 300, as illustrated in FIG. 4, the production mold 400 can be machine-formed.

Figure 5:
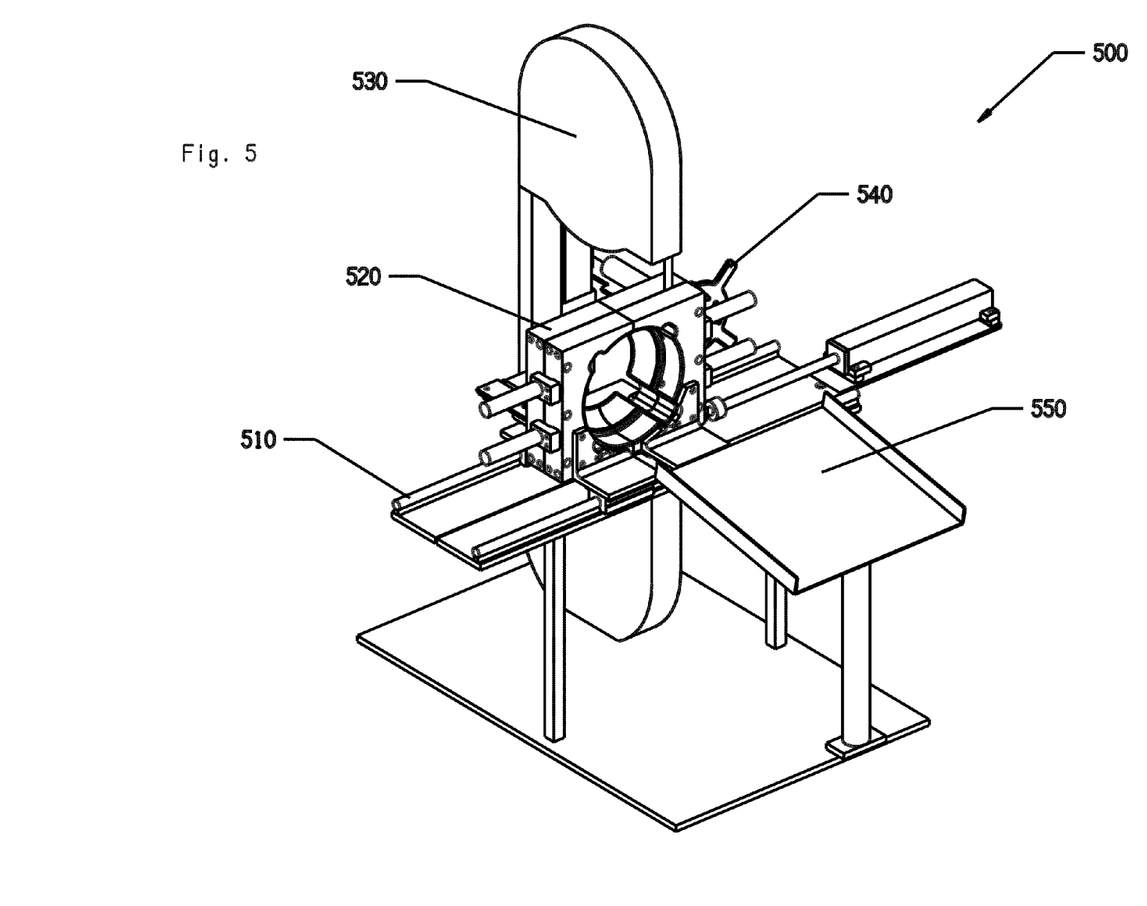
FIG. 5 illustrates a photograph of a finishing saw fixture, in accordance with an exemplary embodiment of the present invention.
Figures 6A, 6B:
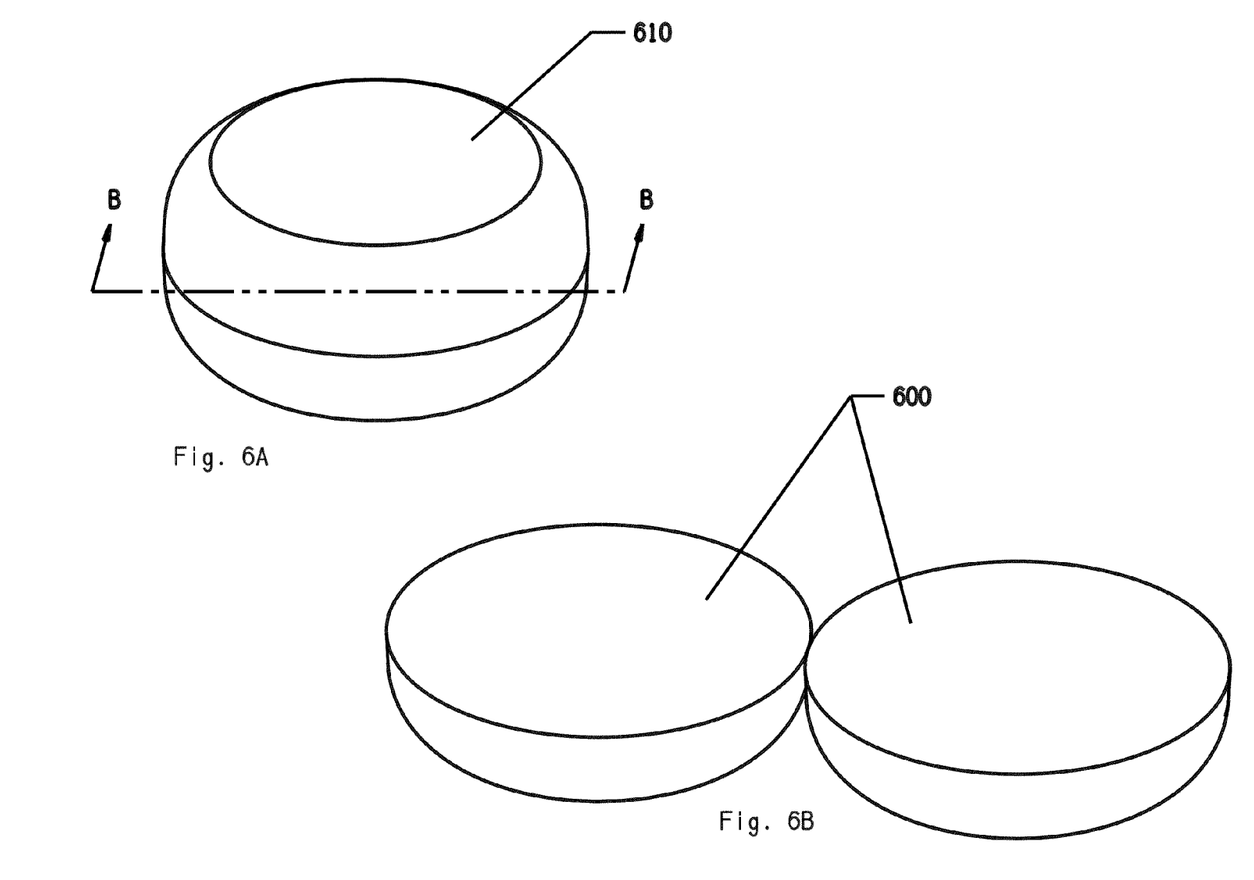
FIG. 6A illustrates a photograph of a foam insert, which is created from the polymer pour mold of FIG. 4, and which may be cut to size with the finishing saw fixture of FIG. 5, in accordance with an exemplary embodiment of the present invention.
FIG. 6B illustrates a photograph of a pair of foam inserts, which are cut to size from the foam insert of FIG. 6A using the finishing saw fixture of FIG. 5, in accordance with an exemplary embodiment of the present invention.

In an exemplary embodiment, after the foam has solidified or hardened, a block of foam 610 is thus formed with the appropriate shape for an insert into the desired container as depicted in FIG. 6A. Further, in this embodiment, the foam block 610 is roughly twice the height needed, thus the foam can be cut to a predetermined size. For example and not limitation, the foam can be cut in half to result in a pair of foam inserts 600 as depicted in FIG. 6B. In this manner, inserts 600 for two separate containers can be produced from a single foam block 610. It is also possible to increase the size (height) of the foam block 610 and to cut the foam into smaller increments (e.g., thirds, fourths, etc). Preferably, the foam can be cut to size via the finishing saw fixture 500, as illustrated in FIG. 5.

In an exemplary embodiment, the finishing saw fixture 500 is a system of many elements. As illustrated in FIG. 5, the fixture 500 includes a channel system 510, a holder 520, a cutting apparatus 530, a release mechanism 540, and an exiting platform 550. Depending on the size of the foam inserts 600 to be created, the holder 510 may change in size and shape. The holder 510 can be made by many means and methods, and is adapted to hold or secure the foam for cutting. The holder 510 is adapted to move along the channel system 520 from at least an insert position, to a cutting position, and ultimately to a release position. In the insert position, the formed foam 10 can be inserted in to the holder 510. The holder 510 can the slide along the channel system 520 to the cutting position. In this position the cutting apparatus 530— for example and not limitation a saw, a band saw, and the like—can slice the foam 10. Then, after the foam 10 has been cut, the holder can slide along the channel system 510 to the release position, wherein the release mechanism 540 causes the cut foam 10 to exit the holder 510 onto the exiting platform 550. The exiting platform 550 can be placed, for example, above a container for assembly in a container, shipment, quality assurance purposes, and the like. The holder 510 can then slide back along the channel system 520 to the insert position, in which the cutting process can be repeated.

Figure 8A:
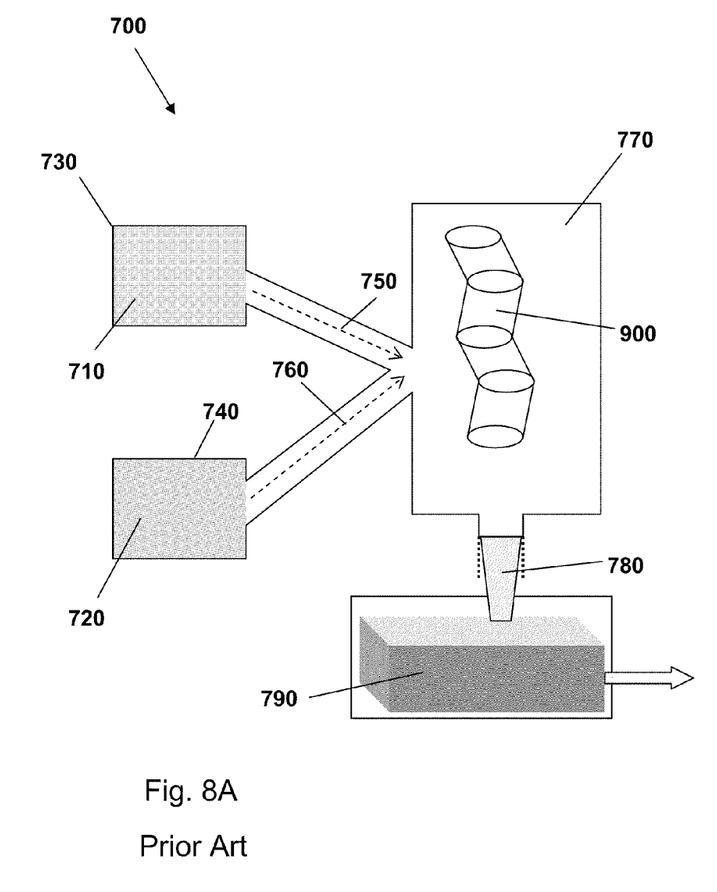
FIG. 8A depicts a conventional system for dispersing foam to create a foam block.

A conventional method for dispensing foam to create a foam block is depicted in FIG. 8A. As shown, the mixing process 700 incorporates a combination of liquid isocyanate 710 and liquid polyol 720 is fed from two separate dispensers 730, 740 through two separate lines 750, 760 and into a mixing head 770. The mixing head 770 includes a rotating screw-type agitator 900, which vigorously mixes the two liquids 710, 720 to form a chemical reaction that creates the foam mixture 780. The foam mixture 780 then passes from the mixing head 770 to form a foam block 790 and then onto a conveyor belt 795 or (or another collection device) so that the foam block 790 can cure for the appropriate time. The resulting mixture will expand to some extent, and, after the requisite cure time, can be fabricated into various shapes and sizes by cutting the cured foam to the desired shape and size. In this process, the fabrication process takes place after the foam block 790 has cured.

Figure 8B:
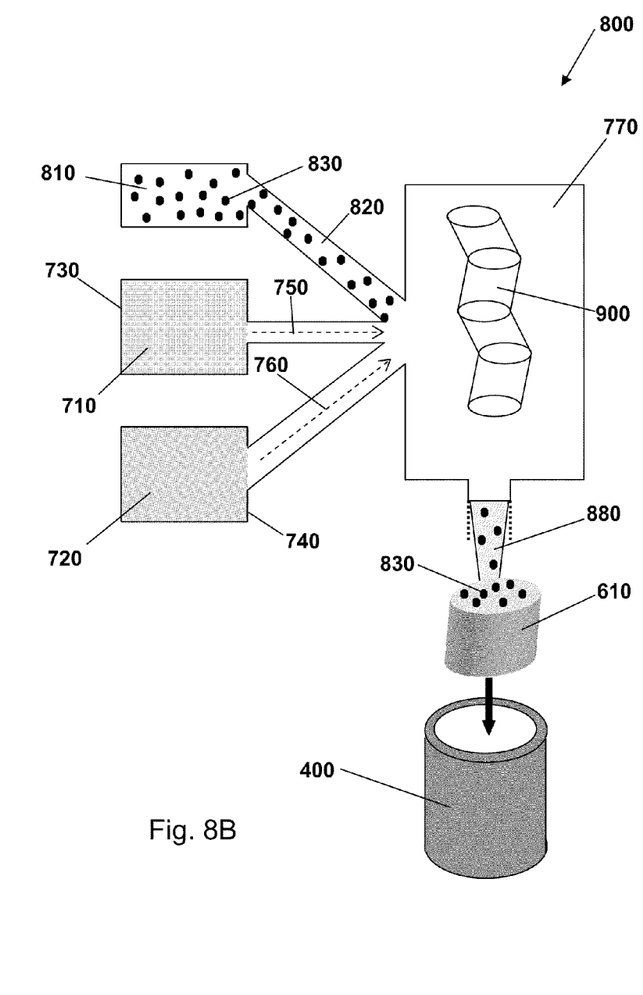
FIG. 8B illustrates a system for dispensing foam that incorporates a growth enhancing element for creating a foam insert sized and shaped for a particular container, in accordance with an exemplary embodiment of the present invention.

An embodiment of the present invention is depicted by the process 800 in FIG. 8B. As shown, a third dispenser 810 and a third line 820 are added to the conventional assembly in which an enhancing element 830 can be introduced into the conventional mixture of the isocyanate 710 and the polyol 720. The enhancing element 830 is depicted in FIG. 8B as a solid pellet-sized fertilizer, but, as discussed above, the enhancing element 830 can be any sort of additive that can provide the desired properties. By introducing the enhancing element 830 into the mixture, and by using the rotating agitator 900 of the mixing head 770, the enhancing element 830 can be uniformly dispersed throughout the resulting foam mixture 880 as it exits the mixing head 770 to form the foam insert 610. In particular, the process is preferably performed by introducing the enhancing element 830 into the mixture 880 prior to the cream time. Thereafter, once the foam insert 610 has cured, the enhancing element 830 will remain in place throughout the foam block 890 unless and until it is intentionally dislodged or is used up in the normal course. In FIG. 8B, the foam mixture 880 is depicted as passing into the mold 400 that is made from the container such that the resulting foam block 610 is shaped to the desired container. Thus, the fabrication process is designed to occur prior to the curing of the foam.

Figure 7A:
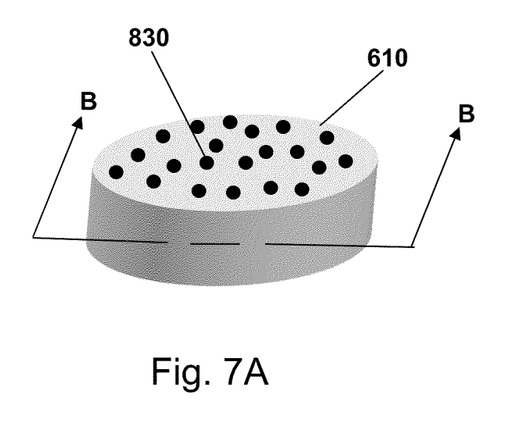
FIGS. 7A and 7B illustrate a perspective view and a cross-sectional view, respectively, of a foam insert that includes a growth enhancing element, depicted in the figures as solid fertilizer pellets, in accordance with an exemplary embodiment of the present invention.
Figure 7B:
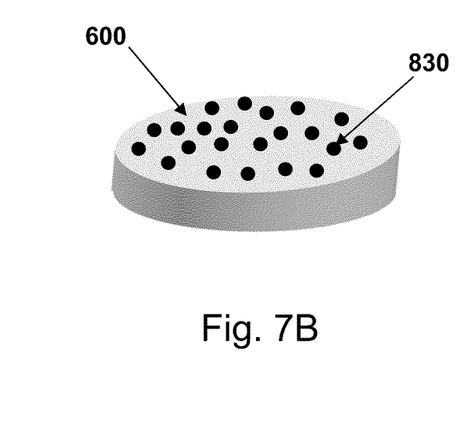

Once the foam block 610 is cured and has been removed from the container, the foam block 610 can be cut as necessary to the desired size as depicted in FIG. 6B. The resulting foam block 610, including the enhancing element 830, is depicted in FIG. 7A. Also, a typical foam insert 600, formed by cutting the foam block 610 along the section B-B, is depicted in FIG. 7B. Because the enhancing element 830 is dispersed throughout the foam block 610, some care must be taken when the block 610 is cut since a small amount of the enhancing element 830 may become dislodged. Otherwise, the remainder of the enhancing element 810 will remain in the foam block 600 as described above.

Figure 8C:
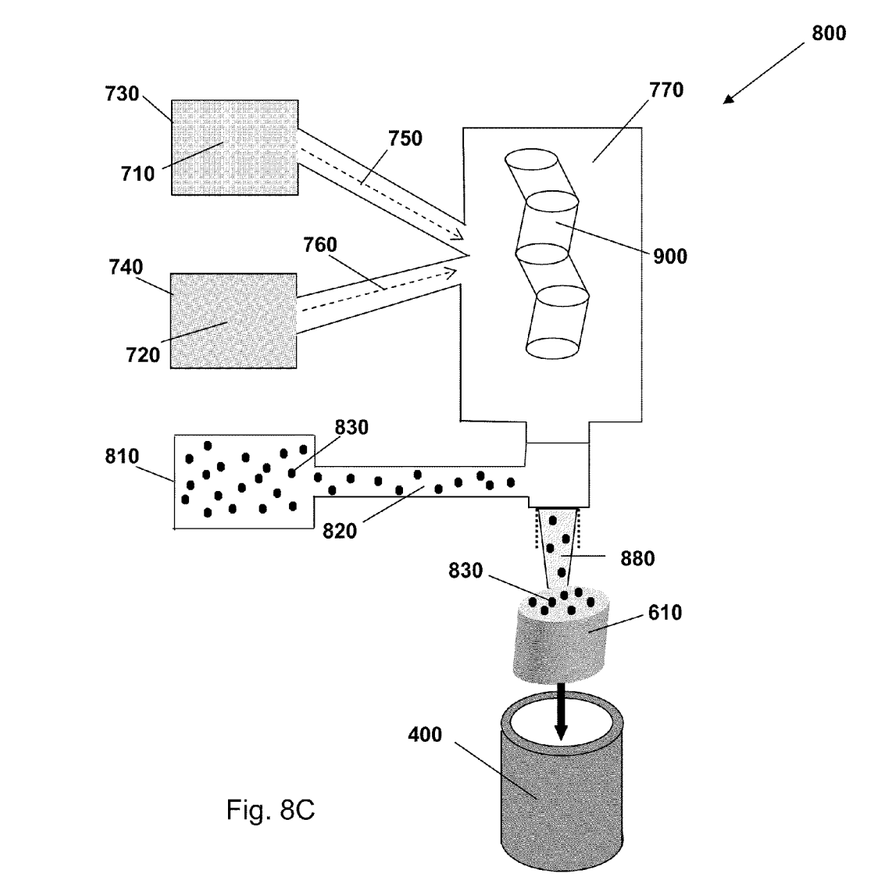
FIG. 8C illustrates another system for dispensing foam that incorporates a growth enhancing element for creating a foam insert sized and shaped for a particular container, in accordance with an another exemplary embodiment of the present invention.

An embodiment of the present invention is also depicted in FIG. 8C in which the third dispenser 810 and third line 820 are positioned such that the enhancing element 830 can be introduced into the process after the formation of the mixture of the liquid isocyanate 710 and the liquid polyol 720 through the lines 750 and 760, respectively. Such an embodiment offers the advantage that the enhancing element is not subjected to the forces introduced by the agitator 900 in the mixing head 770. In all other ways, the process 800 in FIG. 8C is similar to that described in FIG. 8B.

Once the foam block 610 has been cut to size, as in FIG. 6B, the foam insert 600 is created and is ready to be inserted into the container. The plant can be inserted atop the foam insert 600.

In an exemplary embodiment, the foam mixture 880 can be dispensed into a mold in which the foam block 610 is formed to match the size desired, and thus the cutting step can be eliminated. In such an embodiment, the remainder of the steps described above (except for the cutting step) can be performed in like manner to form the foam block 610.

Herein, the use of terms such as "including" or "includes" is open-ended and is intended to have the same meaning as terms such as "comprising" or "comprises" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While exemplary embodiments of the invention have been disclosed many modifications, additions, and deletions can be made therein without departing from the spirit and scope of the invention and its equivalents, as set forth in the following claims.

What is claimed is:

1. A method of forming a container with a foam block insert, comprising:
    providing a container having a major axis approximately parallel to its bottom and a minor axis at approximately a right angle to its major axis;
    creating a first male mold having an outer periphery cooperatively shaped to fit inside the container;
    creating a second female mold from the first male mold, the second female mold having an opening with inner dimensions corresponding to the outer periphery of the first male mold;
    dispensing a foam into the opening of the second female mold;
    curing the dispensed foam to form a foam block insert with outer dimensions corresponding to the opening of the second female mold, the cured foam block insert having a major axis approximately parallel to its bottom and a minor axis at approximately a right angle to its major axis;
    removing the cured foam block insert from the second female mold; and
    inserting the cured foam block insert into the container.

2. The method according to claim 1, wherein the amount of foam dispensed is such that a height of the resulting cured foam block is approximately twice a desired height of the insert to be used in the container, and further comprising cutting the cured foam block along its major axis to form two inserts of the desired height.

3. The method according to claim 1, wherein a method of forming the first male mold comprises:
    measuring the dimensions of the inside of the container;
    calculating the dimensions of the outer periphery of the first male mold to correspond to the measured inside dimensions of the container; and
    fabricating the first male mold according to the calculated dimensions.

4. The method according to claim 3, wherein calculating the dimensions of the outer periphery of the first male mold is performed using computer-aided design solid models.

5. The method according to claim 3, wherein the first male mold is fabricated of wood.

6. The method according to claim 1, wherein the second female mold is vacuum-formed from the first male mold.

7. The method according to claim 6, wherein the vacuum-formed second female mold is polymer-based.

8. The method according to claim 1, wherein the second female mold is machine-formed from the first male mold.

9. The method according to claim 8, wherein the second machine-formed female mold is formed from aluminum.

10. A method of forming a container with a foam block insert, comprising:
- providing a container having a major axis approximately parallel to its bottom and a minor axis at approximately a right angle to its major axis;
- creating a first male mold having an outer periphery cooperatively shaped to fit inside the container;
- creating a second female mold from the first male mold, the second female mold having an opening with inner dimensions corresponding to the outer periphery of the first male mold;
- creating a third male mold from the second female mold, the third male mold having an outer periphery with dimensions cooperatively shaped to fit inside the second female mold;
- creating a fourth female mold from the third male mold, the fourth female mold having an opening with inner dimensions corresponding to the outer periphery of the third male mold;
- dispensing a foam into the opening of the fourth female mold;
- curing the dispensed foam to form a foam block insert with outer dimensions corresponding to the opening of the fourth female mold, the cured foam block insert having a major axis approximately parallel to its bottom and a minor axis at approximately a right angle to its major axis;
- removing the cured foam block insert from the fourth female mold; and
- inserting the cured foam block insert into the container;
- wherein the second female mold is vacuum-formed from the first male mold;
- wherein the third male mold is machine-formed from the vacuum-formed second female mold; and
- wherein the fourth female mold is machine-formed from the third male mold.

11. The method according to claim 10, wherein the amount of foam dispensed is such that a height of the resulting cured foam block is approximately twice a desired height of the insert to be used in the container, and further comprising cutting the cured foam block along its major axis to form two inserts of the desired height.

12. The method according to claim 10, wherein a method of forming the first male mold comprises:
- measuring the dimensions of the inside of the container;
- calculating the dimensions of the outer periphery of the first male mold to correspond to the measured inside dimensions of the container; and
- fabricating the third male mold according to the calculated dimensions.

13. The method according to claim 12, wherein the first male mold is fabricated of wood.

14. The method according to claim 10, wherein the vacuum-formed second female mold is polymer-based.

15. The method according to claim 10, wherein the fourth machine-formed female mold is constructed of aluminum.

16. The method according to claim 10, wherein dispensing the foam into the opening of the fourth female mold further comprises introducing an enhancing element into the foam.

17. The method according to claim 16, wherein the enhancing element comprises particles of a fertilizer material.

18. The method according to claim 16, wherein the enhancing element is introduced prior to a cure time of the foam.

19. A method of forming a container with a foam block insert comprising:
- creating a first male mold having an outer periphery cooperatively shaped to fit inside the container;
- creating a second female mold from the first male mold, the second female mold having an opening with inner dimensions corresponding to the outer periphery of the first male mold;
- introducing an enhancing element into a foam;
- dispensing the foam together with the enhancing element into the opening of the second female mold;
- curing the dispensed foam with the enhancing element to form a foam block insert with outer dimensions corresponding to the opening of the second female mold, the cured foam block insert having a major axis approximately parallel to its bottom and a minor axis at approximately a right angle to its major axis;
- removing the cured foam block insert from the second female mold; and
- inserting the cured foam block insert into the container.

20. The method according to claim 19, wherein the enhancing element comprises particles of a fertilizer material.

* * * * *